United States Patent
Hoehne et al.

(10) Patent No.: US 7,055,183 B2
(45) Date of Patent: Jun. 6, 2006

(54) METHOD AND APPARATUS FOR CLEANING AND DISINFECTING A TOILET SYSTEM IN A TRANSPORT VEHICLE SUCH AS A PASSENGER AIRCRAFT

(75) Inventors: Joachim Hoehne, Hamburg (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 107 days.

(21) Appl. No.: 10/741,985

(22) Filed: Dec. 19, 2003

(65) Prior Publication Data
US 2004/0133968 A1 Jul. 15, 2004

(30) Foreign Application Priority Data
Dec. 20, 2002 (DE) .................. 102 59 997

(51) Int. Cl.
*A47K 13/30* (2006.01)
(52) U.S. Cl. .......................................... 4/233
(58) Field of Classification Search ................ 4/233
See application file for complete search history.

(56) References Cited

U.S. PATENT DOCUMENTS

| | | | |
|---|---|---|---|
| 3,318,449 A | 5/1967 | Jennings et al. ............ 210/104 |
| 3,576,869 A * | 4/1971 | Shellenbaum ................ 564/179 |
| 3,774,246 A | 11/1973 | Beer ........................... 4/227.1 |
| 3,815,158 A * | 6/1974 | Schnyder et al. ............ 4/233 X |
| 3,939,499 A * | 2/1976 | Roberts ........................ 4/320 |
| 5,035,011 A | 7/1991 | Rozenblatt et al. ............ 4/665 |
| 5,106,493 A | 4/1992 | McIntosh ..................... 210/100 |
| 5,245,711 A | 9/1993 | Oldfelt et al. ................. 4/435 |
| 5,454,936 A | 10/1995 | Ask et al. ..................... 210/86 |
| 5,611,088 A | 3/1997 | Almon ......................... 4/222 |
| 6,319,390 B1 * | 11/2001 | Kono et al. .................. 205/701 |
| 2004/0045910 A1 | 3/2004 | Hoffjann et al. ............. 210/758 |

FOREIGN PATENT DOCUMENTS

| | | |
|---|---|---|
| DE | 2907754 | 9/1980 |
| DE | 39 01 320 | 6/1990 |
| DE | G9417730 | 2/1995 |
| DE | 68927589 | 6/1997 |
| DE | 69602367 | 4/1998 |
| DE | 10048299 | 5/2002 |
| WO | WO97/01515 | 1/1997 |

* cited by examiner

*Primary Examiner*—Robert M. Fetsuga
(74) *Attorney, Agent, or Firm*—W. F. Fasse; W. G. Fasse

(57) ABSTRACT

Water, preferably fresh potable water, is electrochemically, e.g. electrolytically, treated to achieve disinfectant properties. The electrochemically treated water is sprayed onto the toilet seat and directed into the toilet bowl for each flush cycle of an aircraft toilet system, so as to clean and disinfect the toilet seat and the toilet bowl. The electrochemically treated water has a direct germ-killing effect on the seat and bowl, and also disinfects the arising wastewater that is conveyed to and stored in a storage tank. For flushing the toilet bowl, the electrochemically treated water may further be mixed with reused graywater, which is thereby disinfected.

26 Claims, 2 Drawing Sheets

METHOD AND APPARATUS FOR CLEANING AND DISINFECTING A TOILET SYSTEM IN A TRANSPORT VEHICLE SUCH AS A PASSENGER AIRCRAFT

PRIORITY CLAIM

This application is based on and claims the foreign priority under 35 USC §119 of German Application 102 59 997.1 filed on Dec. 20, 2002, the entire disclosure of which is incorporated herein by reference.

FIELD OF THE INVENTION

The invention relates to a method and an apparatus for cleaning and disinfecting, i.e. carrying out a hygienization, of toilet systems and particularly the toilet surfaces thereof in stationary or mobile applications, and especially in passenger transport vehicles such as passenger aircraft.

BACKGROUND INFORMATION

In various mobile and stationary applications, water systems including toilet systems are provided for use by persons occupying the mobile or stationary space served by the water systems. Particularly, in the context of a mobile passenger transport vehicle, such as a train, a bus, a ship, or especially a passenger aircraft, an onboard water system includes a toilet system for the disposal of urine and fecal waste from the passengers, as well as a drinking water system supplying fresh potable drinking water and a secondary water use system, for example providing wash water to handwash basins, galley sinks, or even dishwashers, showers, or the like.

In this regard, various terms need to be defined, for use throughout this application. Fresh water or potable water refers to water that is clean, fresh, and free of biological and other contaminants, and thus is suitable as drinking water for the passengers. This fresh potable water is stored in a fresh water tank in the aircraft for use during a flight. Through the use of the toilet system, so-called blackwater results, which is water contaminated with urine, feces, other waste materials, or various contaminants or residues, through which the water is considered biologically contaminated and hazardous. Through the use of handwash basins, galley sinks, and the like, so-called graywater arises, which is the potable drinking water or secondary use water which drains from the drinking water system or the secondary use system, e.g. from the handwash basins, galley sinks and the like, and which is slightly contaminated with soap, detergent, and relatively low amounts of various wastes and contaminants (for example arising from the washing of hands or the like). The term wastewater is a general term that covers both graywater and blackwater. Both the graywater and the blackwater, but especially the blackwater in a higher concentration, are contaminated with various germs, which generally refers to any biological contaminants herein, including bacteria, viruses, yeasts, protozoans, microbes, molds, fungi, or any other biological contaminants.

The wastewater that arises during use of the passenger transport vehicle, e.g. during a flight of a passenger aircraft, often needs to be at least temporarily stored in a wastewater storage tank in the vehicle, e.g. in the aircraft. Due to the biological contamination of the wastewater with various germs as mentioned above, the germs can multiply tremendously during the temporary storage of the wastewater, which leads to possible infection problems, odor problems, and the like. Similarly, surfaces of the various water systems and especially the toilet system, which come into contact with various contaminants such as the toilet surfaces coming into contact with urine, feces, blood, or the like, are thereby subject to biological contamination with various germs. This also causes an odor problem, and presents a hazard of infection to any person who comes into contact, i.e. skin contact, with the contaminated surface. These surfaces are especially the externally exposed surfaces of urinals, toilet bowls, and toilet seats.

Conventional urinals and toilets are subjected to cleaning and disinfection procedures at time-variable intervals, which are often inadequate to satisfy the hygienic demands. For example, during periods of high use of a public toilet, the toilet surfaces may become unacceptably contaminated with various germs arising from the soiling of these surfaces with urine, feces, blood, or other waste materials. This is unsanitary, unhealthful for the subsequent users of the toilet, and also esthetically unacceptable. A method and an apparatus for cleaning toilet surfaces, and especially the toilet seat, at regular intervals, especially corresponding to the frequency of use of the toilet, are needed.

The conventional cleaning and disinfection procedures involve the use of detergents and chemicals in liquid solutions for physically cleaning waste residues from the contaminated surfaces and killing germs remaining on the surfaces. Such detergents and chemicals further load the wastewater and make it more difficult to later biologically process and dispose of the wastewater. Namely, the detergents and chemicals themselves represent chemical and environmental hazards that must be dealt with downstream from their point of use. Also, any residues of such detergents and chemicals remaining on the affected toilet surfaces could be hazardous to any person making skin contact with these surfaces.

There is a strong demand among users of public toilets, including aircraft toilets, for avoiding personal contact of the toilet user with toilet surfaces, e.g. toilet seat surfaces, which are unhygienic or of questionable hygienic nature. Conventional solutions of this problem involve the use of paper seat covers as well as disinfection solutions that are to be applied onto the toilet seat by the user directly before using the toilet. Also, automatic or self-cleaning toilet seats have been offered, in which water is applied to the toilet seat in order to flush or rinse the toilet seat in a mechanical cleaning manner, but without any germ-killing effect. Furthermore, or alternatively, chemical disinfectants can be applied onto the toilet seat.

As a separate development, German Patent Laying Open Document DE 100 48 299 A1 discloses a method and an apparatus for electrolytic disinfection of potable drinking water, secondary use water, and wastewater, by subjecting the water to an anodic electrolytic process, whereby the cathodic formation of hydrogen is prevented by the use of gas diffusion electrodes as the cathode. The reference explains that the electrolytic process disinfects the water by killing microorganisms due to the effect of an electrical current introduced into the water through the electrodes. The particular disinfecting effects can involve the anodic generation of disinfecting agents out of the water itself or substances dissolved in the water, as well as direct killing of the microorganisms through contact with the electrodes or due to the shifted pH value of the water in proximity to the electrodes. This process is also known by the terms electrochemical disinfection, anodic oxidation, and weak current electrolysis. The main point of the reference is to avoid the generation of hydrogen at the cathode during the electrolytic treatment, which occurs in all of the recognized prior art electrolytic water disinfection methods.

SUMMARY OF THE INVENTION

In view of the above, it is an object of the invention to provide a method and an apparatus in a stationary application or especially in a mobile passenger transport vehicle such as a bus, a ship, a train, or especially an aircraft, whereby the method and apparatus achieve the cleaning and disinfection or hygienization of surfaces of toilets including urinals and toilet bowls and toilet seats thereof, and also achieve a disinfection of blackwater conveyed to a wastewater storage tank of the toilet system, without leading to an additional environmental or wastewater volume load. Particularly, the invention aims to completely avoid or omit the use of detergents and chemicals as disinfectants in the treated water, and to mechanically clean as well as disinfect especially the surface of the toilet seat of a toilet bowl. The invention further aims to avoid or overcome the disadvantages of the prior art, and to achieve additional advantages, as apparent from the present specification. The attainment of these objects is, however, not a mandatory feature or limitation of the present invention.

The above objects have been achieved according to the invention, generally in that water, preferably fresh potable water, is subjected to an electrochemical process to form electrochemically treated water having a disinfecting property, which is then used for flushing, cleaning and disinfecting the surfaces of a toilet bowl and the associated toilet seat.

More specifically, the inventive method involves electrochemically treating water (preferably fresh potable water) to produce electrochemically treated water which contains molecular fission and/or reaction products which arise from the electrochemical (e.g. electrolytic) process and which have disinfecting or germ-killing properties, and then directing at least a portion of the electrochemically treated water onto a toilet seat so as to clean, rinse and disinfect the toilet seat. The method further preferably involves directing at least another portion of the electrochemically treated water into the toilet bowl in order to clean, flush and disinfect the toilet bowl. According to a detailed embodiment of the inventive method, the portion of the electrochemically treated water used for flushing the toilet can be dosed and mixed into graywater, so as to form disinfected graywater, which is then used for flushing the toilet. Thereby, the electrochemically treated water is diluted by the graywater, but the resulting disinfected graywater still maintains a disinfecting property.

The above objects have further been achieved according to the invention in an apparatus including a toilet bowl with an associated toilet seat, a wastewater storage tank connected by a drain line to an outlet of the toilet bowl, a water supply such as a fresh potable water supply connected to the input of an electrochemical water treatment device such as an electrolytic cell, and a water distribution arrangement such as an arrangement including one or more spray nozzles connected to an output of the electrochemical water treatment device. The water distribution arrangement, e.g. the water spray nozzle arrangement, is arranged so as to spray the electrochemically treated water onto the toilet seat, thereby cleaning, rinsing and disinfecting the toilet seat. Preferably, the outlet of the electrochemical water treatment device is also connected to a flush water distributor, such as a water flush ring, arranged to direct the flush water into the toilet bowl for flushing the same. Various valves are interposed between the components in order to selectively dose and shut-off the supply of water and thereby control the flushing sequence of flushing the toilet.

One advantage achieved by the inventive method and apparatus is that a disinfection or hygienization of graywater can also be achieved, in order to enable the reuse of graywater as a flushing liquid for flushing the toilet, without detracting from or limiting the cleaning quality of the toilet bowl, for example due to bacterial pre-loading or contamination of the graywater. This also avoids the formation of a biological contaminant film (so-called bio-film) on the flushed surfaces of the toilet when graywater is used for the flushing.

Another advantage achieved by the invention is preferably the complete avoidance of detergents and added chemical disinfectants for the flushing, cleaning and disinfection of the toilet surfaces. Instead, the only substances included in the water for the cleaning, flushing and disinfection, are disinfectant substances that arise as molecular fission products or reaction products of the electrochemical electrolytic process, e.g. anodic oxidation, to which the water is subjected. In this regard, the input water must have a sufficient electrical conductivity for facilitating the electrochemical process. Therefore, a preliminary step may involve the addition of salts or the like to the water in order to adjust the electrical conductivity thereof into the required range. Such salts do not present any chemical, biological, or environmental hazards.

The electrochemically treated water, having the disinfecting effect, can either be used directly, i.e. undiluted, for cleaning, rinsing and disinfecting the toilet seat as well as the toilet bowl, or can be diluted for either or both of these uses. For cleaning the toilet seat, the electrochemically treated water may be mixed and diluted with fresh potable water or secondary use water. For flushing the toilet bowl, the electrochemically treated water can be mixed and diluted with graywater, thereby disinfecting the graywater and still maintaining a sufficient remaining disinfectant effect for cleaning and disinfecting the toilet bowl during the flushing process. When the electrochemically treated water is to be diluted or mixed in this manner, it can be advantageous to initially electrochemically treat the water to a higher degree, i.e. to achieve a higher concentration of the electrochemical reaction products or molecular fission products that have the disinfecting effect.

The proportion of the electrochemically treated water entering the blackwater being flushed from the toilet bowl and stored in the wastewater storage tank also has a disinfecting effect on the blackwater. Namely, the disinfecting substances of the electrochemically treated water have the effect of killing germs in the blackwater, thereby reducing the infection and odor problems that would otherwise arise during the storage of germ-contaminated blackwater.

While the invention preferably uses the electrochemically treated water in the above manner both for cleaning and disinfecting the toilet seat as well as for flushing and disinfecting the toilet bowl, an individual use for either of these purposes could also be provided. In this regard it is preferred according to the invention, that the electrochemically treated water be used at least for the cleaning and disinfection of the toilet seat, whereby the electrochemically treated water is preferably used directly without dilution or mixing.

Yet another advantage of the present invention is that the volume and weight of liquid to be stored and transported in the aircraft can be reduced, and correspondingly the size of the required storage tanks can be reduced. Namely, the amount of a "pre-charge" disinfectant solution to be prefilled into the wastewater tank can be proportionally reduced (for example, the total liquid volume to be stored in the tank is reduced by approximately 5%), because instead the electrochemically treated water processed during the flight can be used for the toilet flushing and disinfection as described above. Especially, the electrochemically treated water can be used to disinfect graywater arising during the flight, so that the disinfected graywater can be reused for flushing the toilets. This also reduces the quantity of flushing water that needs to be stored. Correspondingly also, the amount of arising wastewater is reduced, whereby the reduction especially arises from the reduced quantity of pre-stored pre-charge liquid.

The reduction of the water volume to be stored further leads to the advantage of smaller wastewater storage arrangements being required. In turn, all of the above reduces the total flight weight and increases the usable space in the aircraft, while also reducing the amount of fuel consumed by the aircraft and/or increasing the flight range of the aircraft.

Additionally, the invention further achieves an improved cleaning and disinfection of the toilet and especially the toilet seat, but also the various water lines because the electrochemically treated water flowing therethrough hinders or reduces the formation of so-called bio-films thereon. The invention especially achieves an improved hygiene of the toilet seat due to the germ-killing effect of the electrochemically treated water, as well as the mechanical cleaning influence of the water being sprayed onto the toilet seat after each use of the toilet. This ensures that the toilet seat cleaning is carried out with a frequency corresponding to the frequency of use of the toilet. Also, this achieves not only a disinfection limited to the surface of the toilet seat, but also removes and cleans away any contaminants that have been smeared or otherwise deposited onto the toilet seat surface, such as feces, blood, urine or the like.

BRIEF DESCRIPTION OF THE DRAWINGS

In order that the invention may be clearly understood, it will now be described with reference to the accompanying drawings, wherein.

Figure 1:
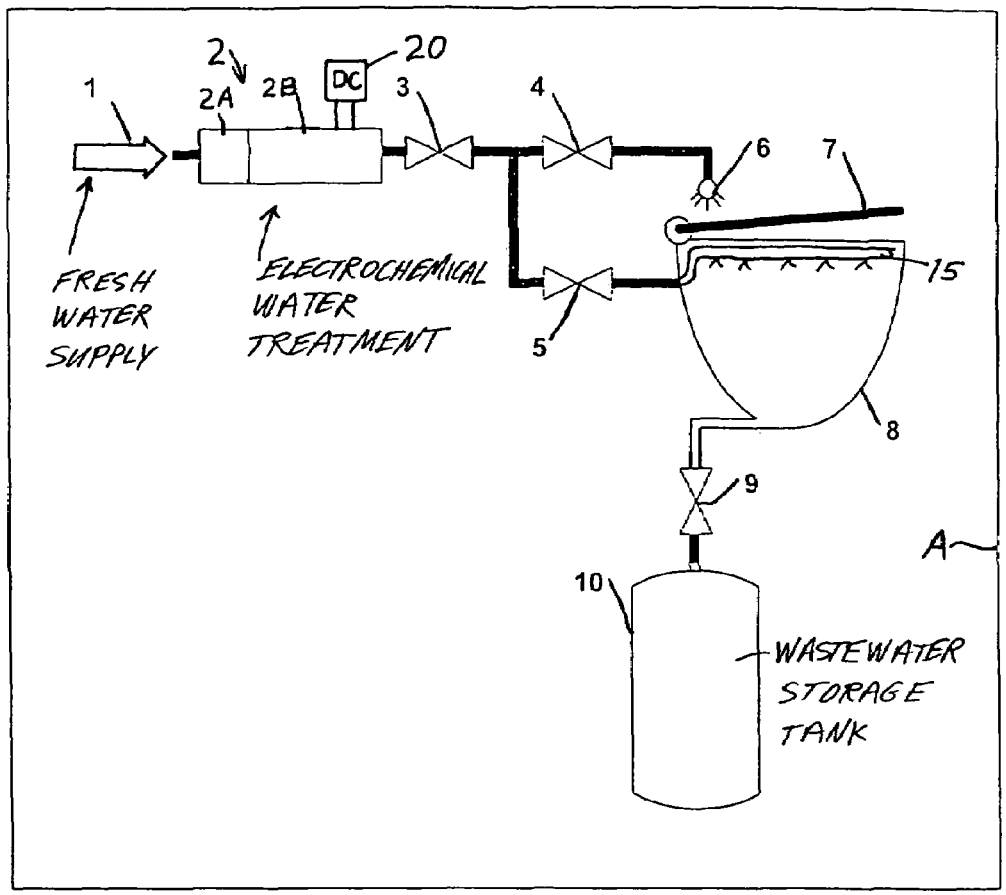
FIG. 1 is a schematic diagram of a first embodiment of an apparatus according to the invention for carrying out a method according to the invention.

DETAILED DESCRIPTION OF PREFERRED EXAMPLE EMBODIMENTS AND OF THE BEST MODE OF THE INVENTION

An example embodiment of the invention will be discussed in connection with a toilet system installed in an aircraft A, which is merely schematically indicated. The aircraft A can be any conventionally known passenger aircraft equipped with a toilet system. In this context, the toilet system includes a water supply 1 which may be a fresh potable water supply or a secondary use water supply or a graywater supply, a toilet bowl 8 including an associated or connected toilet seat 7 (i.e. a seat structure arranged over the toilet bowl and adapted to have a person sit thereon for using the toilet bowl), at least one water line connecting the water supply 1 to the toilet bowl 8 (throughout this application the terms pipe and line generally refer to any pipe, hose, waterline, conduit, channel, duct or any other liquid conveying pathway), and a wastewater storage tank 10 connected by a waste line to an outlet of the toilet bowl 8. The further improvement of such a toilet system according to the invention will be described next.

According to the invention, the water supply 1 is preferably a fresh potable water supply, which is connected to an input or inlet of an electrochemical water treatment device 2, for example comprising an electrolytic cell 2B in which the water is subjected to an electrochemical treatment such as an anodic oxidation or electrolysis, whereby molecular fission products or reaction products having a disinfectant effect are generated, to thereby produce electrochemically treated water provided at the output or outlet of the electrochemical water treatment device 2. The electrolytic cell 2B may comprise an electrically conductive anode connected to a positive pole of a DC power source 20 and an electrically conductive cathode connected to a negative pole of the DC power source 20, with a gap between the cathode and the anode receiving the water therebetween. Since the input fresh potable water from the water supply 1 may have an electrical conductivity that is too low for the electrolytic treatment process, the electrochemical water treatment device 2 may include a salt adding stage 2A in which a salt is added to the water to increase its electrical conductivity to the required level, e.g. at least 600 µS, followed by the electrolytic cell 2B itself.

Further according to the invention, the output of the electrochemical water treatment device 2 is connected through a shut-off and control valve 3 for controlling the toilet flush process, to a pipe junction, from which a first pipe branch extends through a shut-off control and dosing valve 4 for a toilet seat cleaning and disinfection process to a water distribution arrangement 6, such as a nozzle arrangement 6 including one or more water spray nozzles having at least one outlet orifice arranged proximate to the toilet seat 7 and oriented to direct a spray of the electrochemically treated water at the surface of the toilet seat 7. In this context, "proximate" means sufficiently close to spray water onto the toilet seat 7. A second branch or pipe extending from the pipe junction mentioned above is connected through a shut-off control and dosing valve 5 for the toilet bowl flushing process to a flush water distributor such as a flush ring 15 or the like for introducing and distributing the flush water along the inner surfaces of the toilet bowl 8.

The outlet or drain of the toilet bowl 8 is connected through a wastewater flush valve such as a vacuum flush valve 9 via the drain line to the wastewater containment or storage tank 10, so that the urine, fecal waste, and the like, as well as the wastewater from the toilet bowl (forming blackwater) can be conveyed to and stored in the storage tank 10. In the storage tank, the electrochemically treated water mixed into the blackwater will continue to have a disinfectant effect, whereby it will at least reduce the germ loading of the blackwater stored in the tank 10, by killing the various germs contained therein. The wastewater storage tank 10 may simply be a holding tank that stores the wastewater until the tank can be emptied, e.g. when the aircraft is on the ground, or may be a temporary storage tank as a component of an onboard wastewater treatment or processing plant.

A flush controller (not shown), which may be any conventionally known flush controller such as an electronic flush controller, is connected for control signal transmission to the several valves 3, 4, 5, and 9. By pressing a flush button, the user of the toilet can actuate a flushing cycle, whereupon the flush controller actuates the valves 3, 4, 5, and 9 in any sequence and for any duration as necessary, particularly to distribute the appropriate amount of the electrochemically treated water through the valve 4 to the toilet seat cleaning water distribution arrangement 6 and through the valve 5 to the toilet bowl flush ring 15, and then to remove the arising wastewater from the toilet bowl 8 through the valve 9 into the storage tank 10.

As schematically indicated in FIG. 1 and generally known, the toilet seat 7 may be movable between a use-position adapted to have a person sit on the toilet seat 7 for urinating or defecating in the toilet bowl 8, and a non-use-position in which the toilet seat 7 is not positioned to have a person sit thereon. As described above and further shown in FIG. 1, the toilet seat cleaning water distribution arrangement 6, e.g. the outlet orifice of the nozzle arrangement 6, is positioned and oriented to spray the electrochemically treated water onto the toilet seat 7 in the use-position thereof.

After the electrochemically treated water has been sprayed onto the toilet seat 7 in order to flush away any contaminants, clean the seat, and disinfect the seat surface, the water and removed contaminants preferably drain into the toilet bowl. For this purpose, the toilet seat 7 is preferably shaped with a slight conical slope of its surface inwardly and downwardly into the toilet bowl 8. Also, the toilet seat 7 is preferably made of a material, or provided with a surface coating or treatment (e.g. PTFE), that has a water repellent and anti-adhesion property, so as to facilitate the removal of contaminants and the drainage of the water therefrom. Especially with such a water repellent surface, and a sloping surface angled inwardly into the toilet bowl, the toilet seat 7 will be left essentially dry after completion of the flushing cycle, with no need to take further measures to dry the seat. Furthermore, to enhance the disinfection of the toilet seat, the toilet seat itself can be made of a material or provided with a surface coating having antimicrobial agents incorporated therein (any suitable conventionally known anti-microbial agents can be used in this regard). In any event, it must be considered that the materials used for the toilet seat and other components of the toilet system must be an approved material for use in aircraft. In this regard, many or even most synthetic resins are not acceptable and are not approved for use in aircraft due to the flammability of the materials and the hazardous composition of the smoke that evolves during combustion of the materials.

In the embodiment of FIG. 1, the electrochemically treated water produced by the electrochemical water treatment device 2 is used directly, e.g. without dilution or mixing, for both cleaning the toilet seat 7 as well as flushing the toilet bowl 8. Namely, as described above and shown in FIG. 1, the outlet of the electrochemical water treatment device 2 is connected directly to the water distribution arrangement 6 by one or more of pipes, pipe junctions and valves including the shut-off and control valve 3 and the shut-off and dosing valve 4, so as to supply the electrochemically treated water undiluted to the at least one outlet orifice of the water distribution arrangement 6. Similarly, as described above and shown in FIG. 1, the liquid communication path from the outlet of the electrochemical water treatment device 2 to the flush water distributor such as the flush ring 15 comprises or consists of one or more of pipes, pipe junctions and valves including the bowl flushing shut-off and dosing valve 5, so as to provide a direct connection from the outlet of the electrochemical water treatment device 2 to the flush water distributor 15, so as to supply the electrochemically treated water undiluted and unadulterated to the flush water distributor 15. However, such direct use of the electrochemically treated water is not necessary, as will be explained in connection with the varied embodiment according to FIG. 2.

Figure 2:
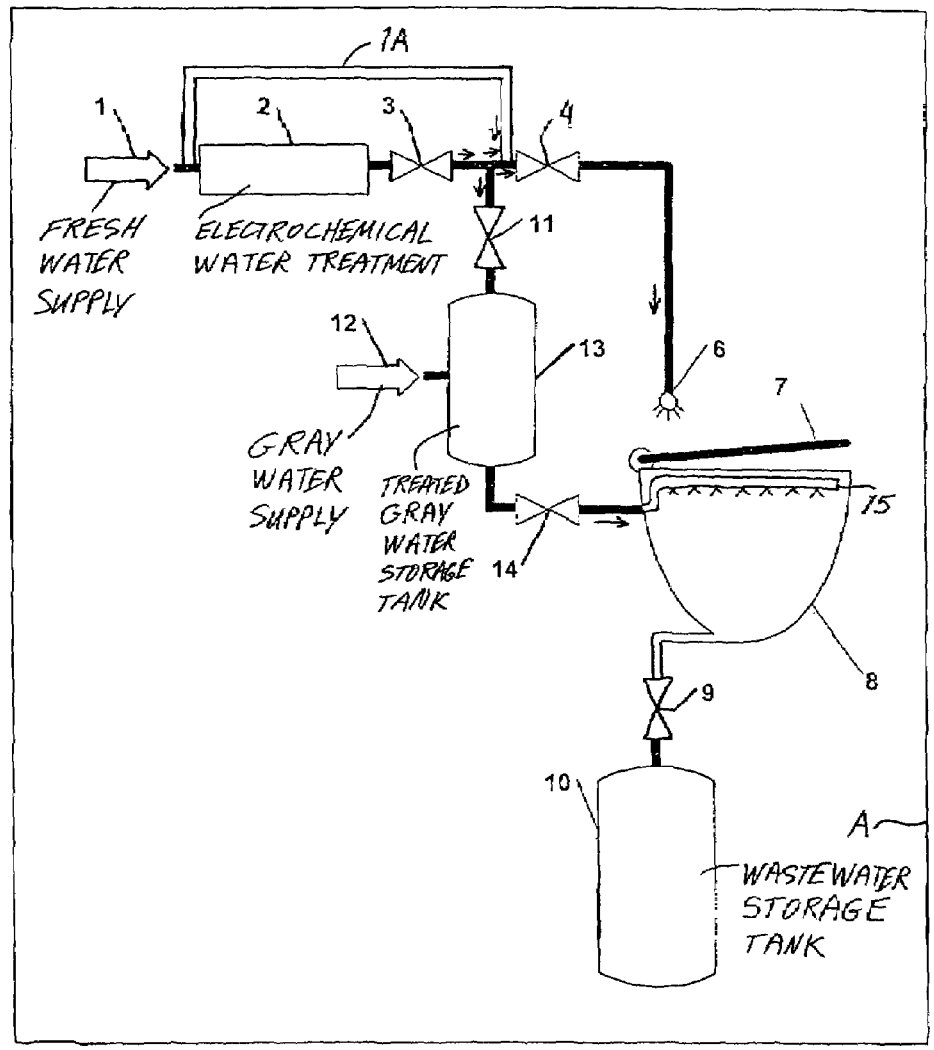
FIG. 2 is a schematic diagram of a second embodiment of an apparatus according to the invention for carrying out a method according to the invention.

The embodiment of FIG. 2 includes many of the same components as described above in connection with FIG. 1, whereby these same components are labeled with the same reference numbers, and will not be described again. In comparison to FIG. 1, the embodiment of FIG. 2 does not directly use the electrochemically treated water for cleaning the toilet seat 7 and/or for flushing the toilet bowl 8.

For example, instead of directly using the electrochemically treated water at 100% concentration for cleaning the toilet seat 7 through the water distribution arrangement 6, a dilution bypass line 1A is provided to mix a proportion of fresh potable water with the electrochemically treated water so as to produce a mixed or diluted treated water solution that is sprayed onto the toilet seat 7 through the water distribution arrangement 6. In this regard, the electrochemically treated water can be produced by the device 2 with a higher concentration of the disinfecting substances, e.g. by carrying out the electrochemical process to a greater extent, in comparison to the embodiment of FIG. 1. In any event, the resulting concentration of the germ-killing substances in the final diluted treated water solution sprayed onto the toilet seat 7 is sufficient for achieving the intended disinfection and cleaning of the toilet seat 7.

Alternatively or additionally to the above described dilution of the seat cleaning water, the embodiment of FIG. 2 involves a mixing of the electrochemically treated water with graywater for producing the flush water. Particularly, the electrochemically treated water is not used directly as flush water for the toilet, but instead is first provided in a dosed manner through a dosing arrangement such as a dosing valve 11 into a graywater intermediate storage and disinfection tank 13, to which graywater is also supplied through a line from a graywater supply 12, such as a graywater temporary storage tank. In this regard, the electrochemically treated water produced by the device 2 can be generated with a higher concentration of the effective germ-killing substances than in the embodiment of FIG. 1. In any event, the electrochemically treated water is introduced into the graywater tank 13 with a sufficient concentration and proportion so as to have a germ-killing and disinfecting effect on the graywater, and still have a remaining germ-killing effect sufficient to act as a disinfectant for the toilet bowl 8 when this treated graywater is introduced through the shut-off control and flush-dosing valve 14 to the spray ring 15 and from there into the toilet bowl 8.

In this manner, the required amount of fresh potable water to be stored in the aircraft is reduced, and also the need for other flush water is reduced or eliminated, because the graywater arising in the aircraft, e.g. through the use of handwash basins and like, is treated and reused for the toilet flushing. Also, since the disinfected graywater is only used for the toilet flushing, while fresh potable water is used for the toilet seat cleaning, there can be no danger or fear of any contamination arising from the reuse of potentially contaminated graywater, even if the electrochemical water treatment device 2 should fail or malfunction. Also, in such a case, the flush controller could simply disable the valve 4 to temporarily discontinue the seat cleaning function for each flush cycle until the device 2 can be serviced.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A toilet system comprising:
   a toilet bowl;
   a toilet seat arranged over said toilet bowl and adapted to have a person sit thereon to use said toilet bowl;
   a water supply adapted to supply input water;
   an electrochemical water treatment device connected to said water supply to receive said input water, and adapted to treat said input water to produce electrochemically treated water at an outlet of said device;
   a water distribution arrangement that is connected to said outlet of said electrochemical water treatment device so as to receive said electrochemically treated water, and that has at least one outlet orifice arranged proximate to said toilet seat and oriented toward said toilet seat and adapted to direct said electrochemically treated water onto said toilet seat;
   a flush water distributor provided in said toilet bowl and a liquid communication path connecting said outlet of said electrochemical water treatment device to said flush water distributor, wherein said liquid communication path includes a bowl flushing shut-off and dosing valve; and
   a seat cleaning shut-off and dosing valve interposed between said outlet of said electrochemical water treatment device and said water distribution arrangement.

2. The toilet system according to claim 1, wherein said water supply is a fresh potable water supply and said input water is fresh potable water.

3. The toilet system according to claim 1, wherein said outlet of said electrochemical water treatment device is connected directly to said water distribution arrangement by one or more of pipes, junctions and valves including said seat cleaning shut-off and dosing valve, to be adapted to supply said electrochemically treated water undiluted to said at least one outlet orifice.

4. The toilet system according to claim 1, further comprising a bypass dilution line connected between said water supply and said water distribution arrangement parallel to and bypassing said electrochemical water treatment device, so as to be adapted to mix a proportion of said input water with said electrochemically treated water to be supplied to said water distribution arrangement.

5. The toilet system according to claim 1, wherein said liquid communication path consists of one or more of pipes, junctions and valves including said bowl flushing shut-off and dosing valve, to provide a direct connection from said outlet of said electrochemical water treatment device to said flush water distributor so as to be adapted to supply said electrochemically treated water undiluted and unadulterated to said flush water distributor.

6. The toilet system according to claim 1, wherein said liquid communication path further comprises a graywater intermediate storage tank interposed between said outlet of said electrochemical water treatment device and said flush water distributor.

7. The toilet system according to claim 6, further comprising a graywater supply that is adapted to supply graywater and that is connected to said graywater intermediate storage tank.

8. The toilet system according to claim 7, wherein said liquid communication path further comprises a shut-off device interposed between said graywater intermediate storage tank and said flush water distributor.

9. The toilet system according to claim 1, wherein said system further comprises a control and shut-off valve interposed downstream from said outlet of said electrochemical water treatment device and upstream from both said bowl flushing shut-off and dosing valve and said seat cleaning shut-off and dosing valve.

10. The toilet system according to claim 1, further comprising a wastewater storage tank, and a waste pipe and an interposed waste valve connecting said wastewater storage tank to a waste outlet of said toilet bowl.

11. The toilet system according to claim 1, wherein said electrochemical water treatment device comprises an electrolytic cell adapted to carry out an electrolytic fission process on said input water to produce said electrochemically treated water.

12. The toilet system according to claim 11, wherein said electrochemical water treatment device further comprises a salination device adapted to introduce a salt into said input water.

13. In an aircraft having a toilet system including a toilet bowl with a bowl outlet, a wastewater storage tank connected to said bowl outlet, a flush water distributor in said toilet bowl, and a water supply connected to said flush water distributor,
   the improvement comprising:
   an electrochemical water treatment device including an electrolytic cell interposed between said water supply and said flush water distributor with an inlet of said device connected to said water supply and with an outlet of said device connected to said flush water distributor,
   a seat cleaning water distribution arrangement that is connected to said outlet of said electrochemical water treatment device and that has at least one outlet orifice arranged proximate to and oriented toward said toilet seat,
   a bowl flushing shut-off and dosing valve interposed between said outlet of said electrochemical water treatment device and said flush water distributor, and
   a seat cleaning shut-off and dosing valve interposed between said outlet of said electrochemical water treatment device and said seat cleaning water distribution arrangement.

14. The improvement in the aircraft according to claim 13, wherein said electrochemical water treatment device is adapted to produce electrochemically treated water at said outlet of said device, and said outlet of said device is connected directly through one or more of pipes, pipe junctions, and valves including said bowl flushing shut-off and dosing valve and said seat cleaning shut-off and dosing valve to said flush water distributor and to said seat cleaning water distribution arrangement so as to be adapted to provide said electrochemically treated water undiluted and unadulterated to said flush water distributor and to said seat cleaning water distribution arrangement.

15. The improvement in the aircraft according to claim 13,
   wherein said water supply is a fresh potable water supply, and said electrochemical water treatment device is adapted to produce electrochemically treated water at said outlet of said device,
   further comprising a graywater intermediate storage tank interposed between said outlet of said device and said flush water distributor, and a graywater supply that is connected to said graywater intermediate storage tank and that is adapted to supply graywater into said graywater intermediate storage tank, and wherein said graywater intermediate storage tank is adapted to receive and mix together a first portion of said electrochemically treated water and a second portion of said graywater to produce treated graywater, and to supply said treated graywater to said flush water distributor.

16. A method of cleaning and disinfecting the toilet system according to claim 1, said method comprising the steps:
   a) supplying said input water from said water supply;
   b) electrochemically treating said input water with an electrochemical treatment process in said electrochemical water treatment device to produce said electrochemically treated water that contains products which arise from said treatment process and which have a disinfectant effect;
   c) directing a seat cleaning liquid containing a first portion of said electrochemically treated water through said outlet orifice at said toilet seat so as to clean and disinfect said toilet seat; and
   d) directing a bowl flushing liquid containing a second portion of said electrochemically treated water through said flush water distributor into said toilet bowl so as to flush, clean and disinfect said toilet bowl.

17. The method according to claim 16, wherein said seat cleaning liquid does not contain any detergent and does not contain any added disinfectant chemical.

18. The method according to claim 16, wherein said bowl flushing liquid does not contain any detergent and does not contain any added disinfectant chemical.

19. The method according to claim 16, wherein said input water is fresh potable water.

20. The method according to claim 16, wherein said seat cleaning liquid consists of said electrochemically treated water undiluted and unadulterated, and said flushing liquid consists of said electrochemically treated water undiluted and unadulterated.

21. The method according to claim 16, further comprising mixing and diluting said first portion of said electrochemically treated water with an additional amount of said input water to prepare said seat cleaning liquid.

22. The method according to claim 16, further comprising mixing and diluting said second portion of said electrochemically treated water with an additional amount of graywater to prepare treated graywater as said bowl flushing liquid.

23. The method according to claim 16, wherein said electrochemical treatment process is a fission electrolysis process.

24. The method according to claim 23, wherein said process comprises providing said input water with an electrical conductivity of at least 600 µS to a gap between an electrically conductive anode and an electrically conductive cathode, and energizing said anode and said cathode by connecting said anode to a positive pole and said cathode to a negative pole of a direct current source.

25. The toilet system according to claim 1, wherein said outlet orifice of said water distribution arrangement is positioned and oriented so as to be adapted to spray said electrochemically treated water onto said toilet seat in a use-position of said toilet seat in which said toilet seat is adapted to have the person sit on said toilet seat to use said toilet bowl for urination or defecation therein.

26. The toilet system according to claim 1, wherein said toilet seat is positioned and adapted so that said electrochemically treated water that is directed onto said toilet seat from said at least one outlet orifice will drain from said toilet seat directly into said toilet bowl.

* * * * *